United States Patent
Rim et al.

(10) Patent No.: US 11,562,416 B1
(45) Date of Patent: Jan. 24, 2023

(54) METHODS AND SYSTEMS FOR AUTOMATIC PRODUCT COMPARISON

(71) Applicant: Capital One Services, LLC, McLean, VA (US)

(72) Inventors: Alexander Rim, Ellicott City, MD (US); Trent Tobler, Hampton, NH (US); Alexander Hardman, Hampton, NH (US); Denise Montesdeoca, Brooklyn, NY (US); Tyler Stauss, San Diego, CA (US); Jose Del Rio, Jackson Heights, NY (US); Kevin Jurkowski, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/546,793

(22) Filed: Dec. 9, 2021

Related U.S. Application Data

(60) Provisional application No. 63/220,892, filed on Jul. 12, 2021.

(51) Int. Cl.
  *G06Q 30/06* (2012.01)
  *G06Q 30/02* (2012.01)
(52) U.S. Cl.
  CPC ..... *G06Q 30/0629* (2013.01); *G06Q 30/0222* (2013.01); *G06Q 30/0627* (2013.01); *G06Q 30/0643* (2013.01)
(58) Field of Classification Search
  CPC ............................................. G06Q 30/06–08
  See application file for complete search history.

(56) References Cited

U.S. PATENT DOCUMENTS

| 9,639,853 B2 | 5/2017 | Shiffert et al. |
| 9,767,520 B2 | 9/2017 | Isaacson et al. |
| 10,937,046 B1 | 3/2021 | Henderson et al. |

(Continued)

OTHER PUBLICATIONS

How to Save Credit Card Info In Safari for Quick Auto-Fill in OS X Mavericks, Feb. 8, 2014 (Year: 2014).*

(Continued)

*Primary Examiner* — Ming Shui
(74) *Attorney, Agent, or Firm* — Bookoff McAndrews, PLLC

(57) ABSTRACT

Disclosed are methods, systems, and non-transitory computer-readable medium for automatic product comparison using price comparison with reward redemption options indicating relative price reduction. For instance, the method may include: responsive to a first trigger condition being satisfied, extracting product information from the currently viewed webpage; determining other source(s) corresponding to the product information; generating a first user interface with comparison information and a redirect link, the comparison information including redemption information for a particular source of the other source(s) in response to the particular source being one of a first set of websites and the particular source having at least one product available that corresponds to the product information extracted from the currently viewed webpage, the redirect link being selectable to open a new webpage for the particular source; and causing the browser to display the first user interface with the comparison information and the redirect link.

13 Claims, 14 Drawing Sheets

(56) References Cited

U.S. PATENT DOCUMENTS

| | | | | |
|---|---|---|---|---|
| 2002/0179704 A1* | 12/2002 | Deaton | .................. | G06Q 20/12 |
| | | | | 235/383 |
| 2005/0197893 A1* | 9/2005 | Landau | .............. | G06Q 30/0211 |
| | | | | 705/14.23 |
| 2006/0031123 A1* | 2/2006 | Leggett | .............. | G06Q 30/0629 |
| | | | | 705/26.64 |
| 2008/0168008 A1* | 7/2008 | Brown | .................. | G06Q 30/02 |
| | | | | 705/400 |
| 2008/0255967 A1* | 10/2008 | Shi | ..................... | G06Q 30/0643 |
| | | | | 705/26.63 |
| 2009/0037275 A1* | 2/2009 | Pollio | .................. | G07F 7/0866 |
| | | | | 705/14.27 |
| 2013/0191227 A1* | 7/2013 | Pasa | ..................... | G06Q 20/027 |
| | | | | 705/41 |
| 2013/0234911 A1* | 9/2013 | Lee | ........................ | H01Q 21/28 |
| | | | | 343/893 |
| 2014/0279252 A1* | 9/2014 | Lampert | ............ | G06Q 30/0633 |
| | | | | 705/26.62 |
| 2014/0304161 A1* | 10/2014 | Fisher | .................... | G06Q 20/00 |
| | | | | 705/44 |
| 2015/0287118 A1* | 10/2015 | Wong | ................. | G06Q 30/0601 |
| | | | | 705/26.63 |
| 2016/0034867 A1 | 2/2016 | Isaacson et al. | | |

OTHER PUBLICATIONS

"How to Pay on Amazon Using a Gift Card," Anthony Godinho, Feb. 6, 2015, available at https://www.youtube.com/watch?v=3nilhO6FDJw (Year: 2015).*

International Search Report and Written Opinion in Application No. PCT/US2021/062781, dated Mar. 25, 2022 (13 pages).

* cited by examiner

300I

CHOOSE PAYMENT METHOD ×  SECOND_WEBSITE.COM/CHECKOUT

PATENT LINKS    EXTENSION

CHECKOUT

① DELIVERY    ARRIVES BY TUE, JUL 6    EDIT

② SENDING TO   DELIVERY ADDRESS   JOHN DOE
                                  2020 K ST NW STE 400
                                  WASHINGTON, DC 20006
               EMAIL              JOHN.DOE@EMAIL.COM    EDIT

③ ENTER PAYMENT METHOD

CREDIT CARD | GIFT CARD | + MORE

REQUIRED FIELD *
GIFT CARD NUMBER*

PIN/SECURITY CODE (4 DIGITS)*

DON'T HAVE A PIN?

PHYSICAL GIFT CARD
PIN IS ON THE BACK OF THE CARD.
PLEASE SEE EXAMPLE BELOW.

CARD NUMBER  PIN
1234 1234 1234 1234 PIN #1234 eGIFT CARD
PIN IS IN THE CONFIRMATION EMAIL

SUBTO
NEXT
TAX
TOTAL
SEE I

372 —

374

WOULD YOU LIKE TO REDEEM $10 IN SHOPPING REWARDS TOWARD THIS PURCHASE?
YOUR REWARDS WILL BE REDEEMED AS A GIFT CARD AND AUTOMATICALLY APPLIED AFTER REDEMPTION.
<u>LEARN MORE</u> ABOUT SHOPPING REWARDS    376

REDEEM MY REWARDS

<u>I DON'T WANT TO REDEEM MY REWARDS.</u>

*FIG. 3I*

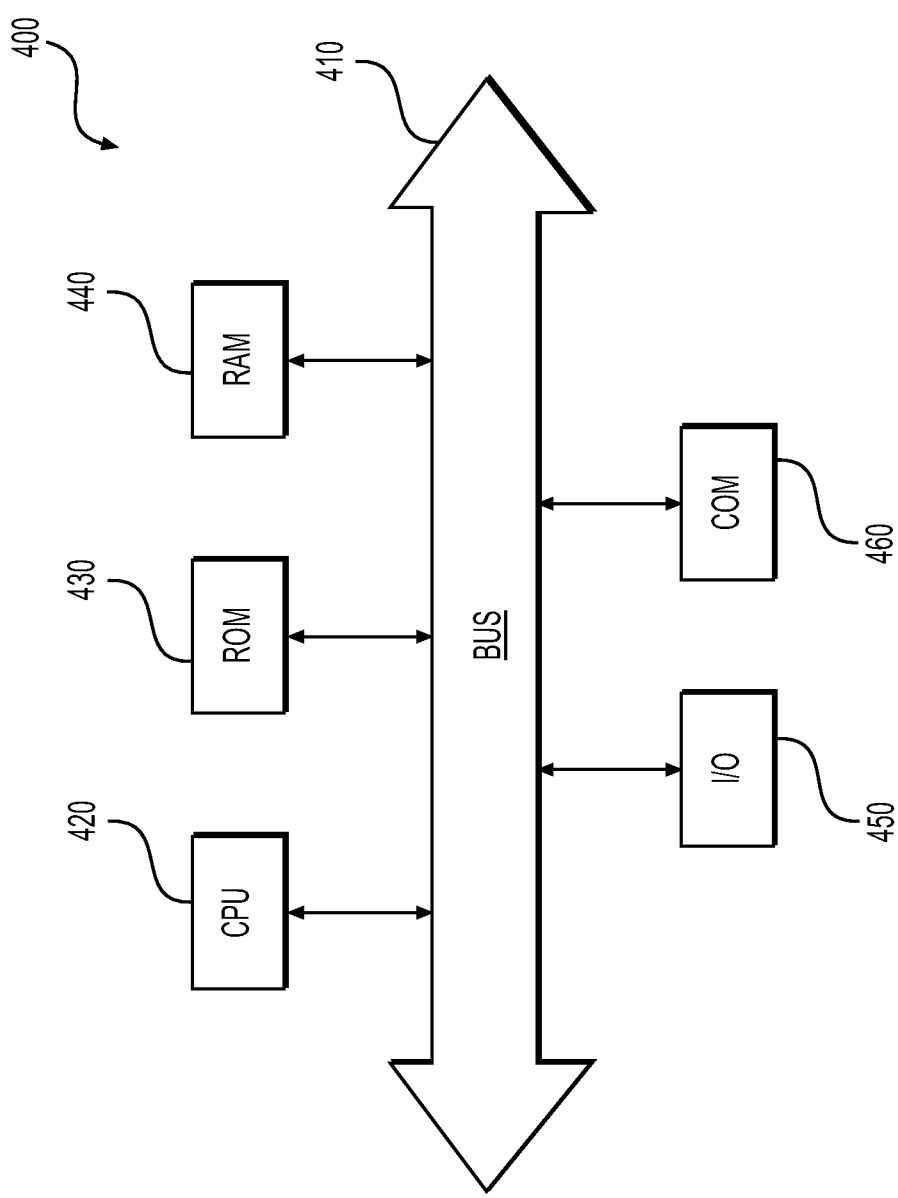

METHODS AND SYSTEMS FOR AUTOMATIC PRODUCT COMPARISON

CROSS-REFERENCE TO RELATED APPLICATION(S)

This patent application claims the benefit of priority to U.S. Provisional Application No. 63/220,892, filed on Jul. 12, 2021, the entirety of which is incorporated herein by reference.

TECHNICAL FIELD

Various embodiments of the present disclosure relate generally to methods and systems for automatic product comparison and, more particularly, to methods and systems for automatic product comparison using price comparison with reward redemption options indicating relative price reduction to reduce processor and resource use by consolidating results.

BACKGROUND

Product comparison usually requires navigating to several different source(s) to compare each feature as offered from different websites. Moreover, a significant subset of the shopping population do not use rewards associated with various accounts, which could significantly adjust relative price comparisons between different source(s). Therefore, there is a challenge in how to effectively communicate true cost (considering rewards redemptions) and product/price comparison online.

Furthermore, a usual manner of rewards redemption is to generate gift card information for a user and communicate the gift card information in an out-of-band communication (e.g., by mail or email) to a user. This type of activity may significantly delay gift card use for rewards redemption (as users wait for and/or fail to use the gift card information) and may introduce transcription errors in entering gift card information on online purchases. Therefore, another challenge lies in how to promote the use of rewards while reducing delay and/or transcription errors.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for methods and systems for automatic product comparison, including automatic product comparison for reduction in resource usage by consolidating results.

For instance, an exemplary method may include: monitoring a browser session of a browser operating on a user device associated with a user; determining whether a first trigger condition is satisfied based on monitoring the browser session, the first trigger condition indicating whether a currently viewed webpage is an item webpage or a checkout webpage of a website of a second set of websites different from a first set of websites; responsive to the first trigger condition being satisfied, extracting product information from the currently viewed webpage; determining other source(s) corresponding to the product information; responsive to determining the other source(s), generating a first user interface with comparison information and a redirect link, the comparison information including redemption information for a particular source of the other source(s) in response to the particular source being one of the first set of websites and the particular source having at least one product available that corresponds to the product information extracted from the currently viewed webpage, the redirect link being selectable by a user selection to open a new webpage for the particular source; and causing the browser to display the first user interface with the comparison information and the redirect link.

An exemplary system may include at least one memory storing instructions; and at least one processor executing the instructions to perform operations. The operations may include: monitoring a browser session of a browser operating on a user device associated with a user; determining whether a first trigger condition is satisfied based on monitoring the browser session, the first trigger condition indicating whether a currently viewed webpage is an item webpage or a checkout webpage of a website of a second set of websites different from a first set of websites; responsive to the first trigger condition being satisfied, extracting product information from the currently viewed webpage; determining other source(s) corresponding to the product information; responsive to determining the other source(s), generating a first user interface with comparison information and a redirect link, the comparison information including redemption information for a particular source of the other source(s) in response to the particular source being one of the first set of websites and the particular source having at least one product available that corresponds to the product information extracted from the currently viewed webpage, the redirect link being selectable by a user selection to open a new webpage for the particular source; and causing the browser to display the first user interface with the comparison information and the redirect link.

An exemplary non-transitory computer-readable medium may store instructions that, when executed by a processor, cause the processor to perform a method. The method may include: monitoring a browser session of a browser operating on a user device associated with a user; determining whether a trigger condition is satisfied based on monitoring the browser session, the trigger condition indicating whether a currently viewed webpage is a checkout webpage of a website of a first set of websites different from a second set of websites; responsive to trigger condition being satisfied, generating a user interface with including redemption information and a confirmation element, the confirmation element being selectable by a user selection to automatically obtain and apply gift card information on a shopping cart of the checkout webpage for an amount indicated by the redemption information; and causing the browser to display the user interface with the redemption information and the confirmation element.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 3A-3J depict GUIs for automatic product comparison using price comparison with reward redemption options indicating relative price reduction, according to one or more embodiments.

FIG. 4 depicts an example system that may execute techniques presented herein.

DETAILED DESCRIPTION OF EMBODIMENTS

Figure 1:
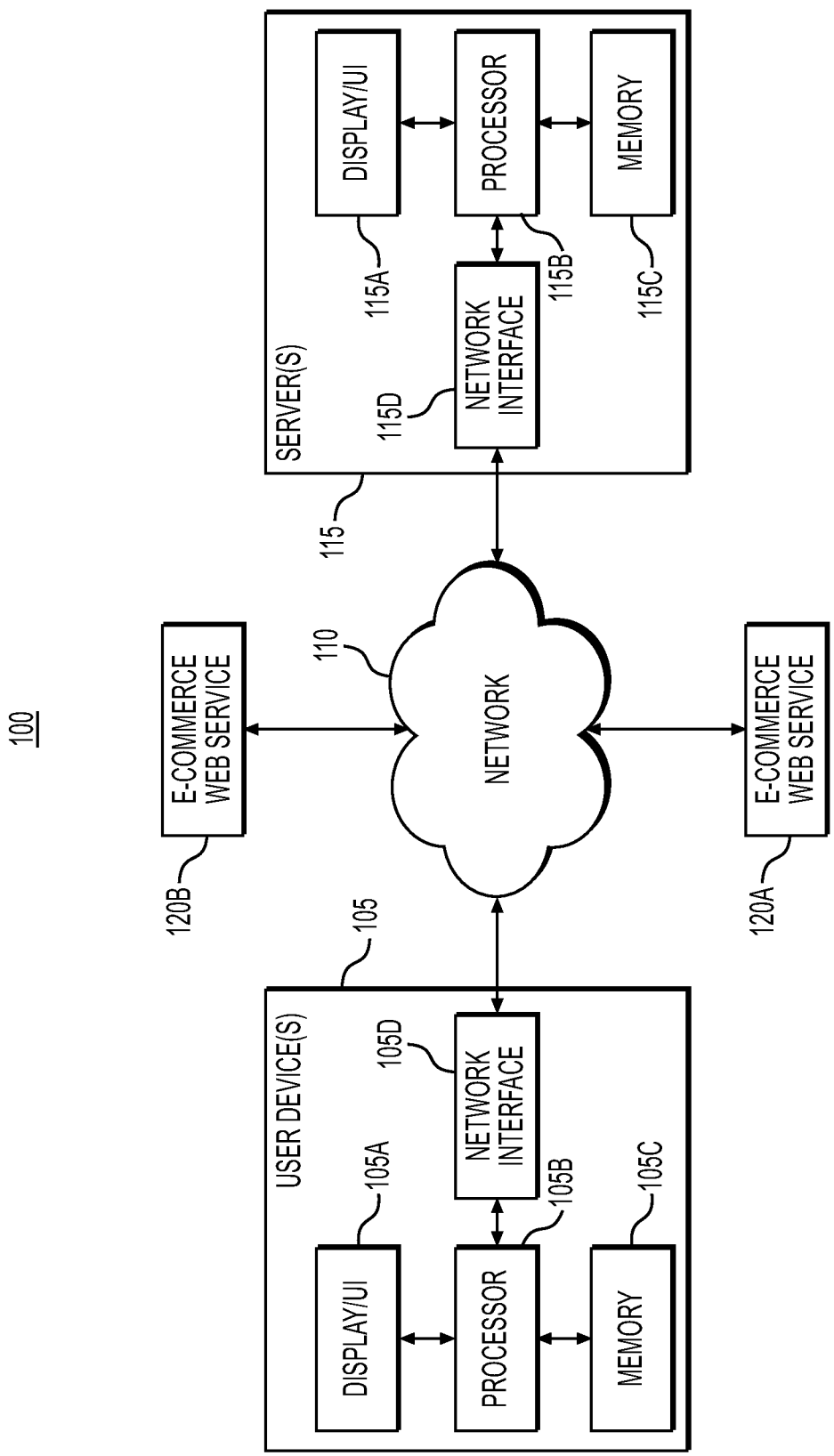
FIG. 1 depicts an exemplary system for automatic product comparison using price comparison with reward redemption options indicating relative price reduction, according to one or more embodiments.

Various embodiments of the present disclosure relate generally to methods and systems for automatic product comparison.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to methods and systems for automatic product comparison using attribute comparisons with reward redemption options indicating relative price reduction. By automatically performing attribute comparisons, the techniques disclosed herein may provide outputs (e.g., comparison results) in a manner faster than targeted searching and application of external factors (e.g., rewards). Such automatic attribute comparison, thus, provides the technical benefit of reducing resources (e.g., processors, monitors, inputs, etc.) used during the slower targeted searching, thereby reducing energy use (e.g., battery use) and/or increasing resource lifespan. For instance, systems of the present disclosure may automatically determine different source(s) for online items and accurately present differences in attributes (e.g., costs) after taking into consideration the redemption of rewards associated with a user's account. Moreover, the systems of the present disclosure may automatically obtain reward redemption gift cards on behalf of a user and apply them to a user's shopping cart, thereby reducing transcription errors and saving the user's time and effort. Automatically obtaining and/or applying gift cards (e.g., electronic gift cards) may reduce the storage space associated with storing an un-used or partially used gift card. According to an implementation, one or more gift cards associated with a user may be stored in a cache. A user may approve or deny the application of one or more gift cards. Based on the approval or denial, the one or more gift cards may be removed from the cache.

FIG. 1 depicts an exemplary system 100 for automatic product comparison using attribute (e.g., price) comparison with reward redemption options indicating relative price reduction, according to one or more embodiments. The system 100 may include one or more user device(s) 105 (hereinafter "user device 105" for ease of reference), a network 110, one or more server(s) 115 (hereinafter "server 115" for ease of reference), and one or more e-commerce web servers, such as, for example, e-commerce web servers 120A and 120B.

The user device 105, the server 115, and the one or more e-commerce web servers 120A and 120B may be connected via the network 110, using one or more standard communication protocols. The network 110 may be one or a combination of the Internet, a local network, a private network, or other network. The user device 105 and the server 115 may transmit and receive messages from each other across the network 110, as discussed in more detail below. The user device 105 and e-commerce web servers, such as, for example, e-commerce web servers 120A and 120B, may also respectively transmit and receive messages from each other across the network 110.

The server 115 may include a display/UI 115A, a processor 115B, a memory 115C, and/or a network interface 115D. The server 115 may be a computer, system of computers (e.g., rack server(s)), or a cloud service computer system. The server 115 may execute, by the processor 115B, an operating system (O/S) and at least one instance of a management program (each stored in memory 115C). The management program may provide information to and/or perform processing for one or more user devices, such as the user device 105, as discussed in more detail below, to enable instances of a shopping assistant. The memory 115C may also store the management program, e-commerce website information, account information, and/or ledger information. The management program may manage the e-commerce website information, the account information, and/or the ledger information in accordance with messages from the user devices 105 (e.g., user requests and actions associated with their accounts), in accordance with rules, etc. of the shopping assistant. The display/UI 115A may be a touch screen or a display with other input systems (e.g., mouse, keyboard, etc.) for an operator of the server 115 to control the functions of the server 115 (e.g., update the management program, the e-commerce website information, the account information, and/or the ledger information). The network interface 115D may be a TCP/IP network interface for, e.g., Ethernet or wireless communications with the network 110.

The e-commerce website information may include information regarding a first set of websites and a second set of websites. The first set of websites may include websites (e.g., domains) associated with the shopping assistant, websites for which gift cards can be automatically obtained on behalf of users of the shopping assistant, and/or websites of preferred partners of the shopping assistant. The second set of websites may be a defined plurality of e-commerce websites (e.g., domains) that are not among the first set of websites, or any other website (e.g., domain) that are not among the first set of websites. In some embodiments, the second set of websites are not exhaustively defined. For example, in some embodiments, any website not included in the first set of websites may be defined, e.g., implicitly, as a member of the second set of websites.

The account information may include information associated with a plurality of users of the shopping assistant. For instance, for each user of the shopping assistant, the account information may include, but is not limited to, account status, login credentials, rewards amount, eligibility for rewards redemption, user history with the shopping assistant, user preferences, etc.

The ledger information may include unassigned gift cards information, associated-but-not-used gift cards information, and/or associated-and-used gift card information. Unassigned gift cards information may include information for particular gift cards that have not been assigned to a user of the shopping assistant. Associated-but-not-used gift cards information may include information for particular gift cards that have been assigned to a user of the shopping assistant but not yet used. Associated-and-used gift card information may include information for particular gift cards that have been assigned to a user of the shopping assistant but not yet used or partially used. One of skill in the art would recognize that the various information managed by the management program may be combined or separated into a same or different data structures or data stores (e.g., databases, data lakes, etc.) as a matter of design choice.

The user device 105 may include a display/UI 105A, a processor 105B, a memory 105C, and/or a network interface 105D. The user device 105 may be a desktop computer, a laptop computer, or a mobile device, such as a cell phone, a tablet, etc. The user device 105 may execute, by the processor 105B, an operating system (OS) and an application. In the context of the user device 105 being a desktop computer or laptop computer, the application may be a browser program with a browser extension installed, or alternatively, may be a browser alone natively including the capabilities disclosed herein. The browser may generate one or more graphic user interfaces (GUIs) based on instructions/information stored in the memory 105C, instructions/information received from the server 115, and/or the one or more e-commerce web servers 120A and/or 120B. The GUIs may display webpages of websites based on webpage documents. The webpage documents may include HTML, CSS, and/or scripts, such as JavaScript. The browser may update and/or change GUIs based on user inputs as a user navigates websites. As noted above, the capabilities disclosed herein may be native to a browser (e.g., without the use of an extension, plug in, or widget). The browser may also display other user interfaces, e.g., from the browser or extension based on instructions from the browser or extension, as detailed below. Although the implementations disclosed herein are described with respect to a browser extension, in some implementations, the code and capabilities attributed to a browser extension, disclosed herein, may also be performed by code native to a browser or a back-end platform associated with the browser. In the context of the user device 105 being a mobile device, the application may be a customer application, a shopping application, a banking application, etc. that has an incorporated mobile browser to navigate websites and display/interact with webpages hosted by, e.g., e-commerce websites such as, for example, e-commerce web servers 120A and 120B. Therefore, while the remainder of the disclosure references a browser and/or browser extension, one of skill in the art would recognize that similar monitoring, processing, generating, and displaying of user interfaces may be accomplished within a mobile application with a mobile browser. The display/UI 105A may be a touch screen or a display with other input systems (e.g., buttons, keyboard, etc.) to display the GUIs. The network interface 105D may be a TCP/IP network interface for, e.g., Ethernet or wireless communications with the network 110. The processor 105B, while executing the mobile application, may receive user inputs from the display/UI 105A, and perform actions or functions in accordance with the mobile application.

The browser or extension may be a software application added to the browser program. The browser or extension may be an instance of the shopping assistant, so that, for example, user(s) of the user device 105 may use particular functionality while browsing websites and webpages, such as webpages of e-commerce websites. The browser or extension may provide various functionality, including coupon code assistance, product/price comparison assistance, rewards assistance, etc. The browser or extension may provide personalized assistance in association with a user account. The browser or extension may or may not require a user to login (e.g., using username and password credentials, second factor authentication, etc.) to a user account to use all or some of the functionality.

In at least one embodiment, the browser or extension may automatically monitor a browser session (e.g., via periodic pings, based on user input, based on change in code, based on network pings, etc.) of the browser operating on the user device 105 associated with a user; and (in certain circumstances) display user interfaces for automatic product comparison using attribute (e.g., price) comparison with reward redemption options indicating relative price reduction. To monitor the browser session, the browser or extension may obtain webpage documents and/or network requests/responses (as transmitted and received); and analyze the webpage documents and/or the network requests/responses to determine a website domain, type of webpage, content of webpages, etc. of currently viewed webpages of the browser. Based on certain criteria (particular website domain, particular type of webpage, and/or particular content of webpages, as discussed below), the browser or extension may display a first user interface, a second user interface, or a third user interface. Generally, the user interfaces update a GUI displaying a currently viewed webpage with additional information, links, and/or confirmation elements relevant to the currently viewed webpage. The additional information may indicate an alternative source for a same item as indicated by the currently viewed webpage, a comparison of expected costs for the item from each source, and/or potential redemption information when the item is available from particular source(s). The additional information may be automatically presented. The additional information may reduce the amount of time that electronic resources (e.g., processors, displays, memory, etc.), are used to determine the information provided via the automatically presented additional information. By automatically providing the additional information (e.g., via a GUI), multiple options for respective multiple sources may be presented at the same time. Therefore, automatically providing the additional information may prevent a targeted search for each source. Accordingly, the amount of time and, thus, amount of electronic resources used to receive the additional information may be less than the amount of time/amount of electronic resources used for a targeted search across each source. The reduction in time and resources may result in a lower amount of energy (e.g., battery, power, etc.) used and/or may increase the lifespan of one or more resources.

The links may redirect the browser to a comparison webpage (hosted by the server 115 associated with the shopping assistant) or to an alternative source webpage for the particular product. The confirmation elements may initiate a redemption process between the browser or extension and the server 115, as discussed in more detail below.

In particular, the first user interface may include comparison information for a particular product and a redirect link for alternative sources for the particular product. The browser or extension may generate and display the first user interface in response to the browser currently viewing an item webpage and/or checkout page of a website ("first trigger condition"). The first trigger condition may only trigger on a website of the second set of websites. Additionally or alternatively, the first trigger condition may trigger also when on a website of the first set of websites, if a particular product is available at an alternative source below a minimum cost possible to achieve on any of the first set of websites as a primary or alternative source (e.g., after rewards and/or redemption information is taken into account). Generally, the browser or extension may determine an item page by determining one or more (or combinations): the webpage uniform resource locator (URL) (or portions thereof), HTML tags, buttons, etc. of the content of the webpage (e.g., "add to cart" button), and/or text of the content (e.g., "price," "size," etc.) of the currently viewed webpage. Similarly, the browser or extension may determine a checkout page by determining one or more (or combinations): the webpage URL (or portions thereof), HTML tags, buttons, etc. of the content of the webpage (e.g., "address," "credit card," etc.), and/or text of the content being displayed ("total," "taxes", "shipping," etc.) of the currently viewed webpage. One of skill in the art would recognize that there are a number of ways to detect and identify such webpages, and the scope of this disclosure is not meant to be limited by these examples. The comparison information may display first source information and second source information. The first source information may include offer detail data of the particular product on the currently viewed webpage, including cost, shipping, taxes, availability, expected shipping timeframe, rewards available, and/or rewards redemption (if a currently viewed webpage is from the first set of websites). The second source information may include offer detail data of the particular product from an alternative source, including cost, shipping, taxes, availability, expected shipping timeframe, rewards available, and/or rewards redemption (if an alternative source is from the first set of websites). In this manner, a user may view comparative product information, including any applicable rewards redemption that may reduce a purchase price while staying on a currently viewed webpage.

The browser or extension may obtain the first source information by parsing the currently viewed webpage and extracting the offer detail data for cost, shipping, taxes, availability, and/or expected shipping timeframe. Additionally or alternatively, the browser or extension may generate and send a request to an e-commerce webserver corresponding to the currently viewed webpage to request the offer detail data. For instance, the browser or extension may transmit an API call for the data if the e-commerce webserver supports such API calls. Additionally or alternatively, the browser or extension may generate and transmit particular request message(s) to cause the e-commerce webserver to transmit response(s) including the offer detail data; and process the responses to obtain the offer detail data from the response(s).

The browser or extension may obtain the second source information by extracting product information for one or more products from the currently viewed webpage; and determining whether there are any other source(s) for the one or more products based on the product information. To extract the product information for one or more products from the currently viewed webpage, the browser or extension may parse the currently viewed webpage and extract product data for the one or more products. For instance, the browser or extension may (for an item webpage) determine a product based on product data including a product ID, product description, brand, product parameters (e.g., size, color, etc.), and/or other content of the webpage, and (for a checkout page) extract similar product data (if present on the checkout page), or from crawling links to the particular product webpages and extracting the product data from that webpage from the website. Additionally or alternatively, the browser or extension may generate and send a request to an e-commerce webserver corresponding to the currently viewed webpage to request the product data. For instance, the browser or extension may transmit an API call for the product data if the e-commerce webserver supports such API calls. Additionally or alternatively, the browser or extension may generate and transmit particular request message(s) to cause the e-commerce webserver to transmit response(s) including the product data; and process the responses to obtain the product data from the response(s).

To determine whether there are any other source(s) for the one or more products based on the product information, the browser or extension (or the server 115 in response to a request from the browser or extension indicating the product information) may obtain inventory information for a plurality of sources; and determine whether any of the plurality of sources has available at least one product of the one or more products available based on the inventory information and the product information. To obtain the inventory information, the browser or extension (or the server 115) may maintain an offer detail database of products available at respective sources (e.g., websites), along with corresponding offer detail data for those products at respective sources. Additionally (e.g., if a particular product is not in the offer detail database) or alternatively, the browser or extension (or the server 115), may transmit request(s) to particular sources (e.g., the first set of websites), to relevant sources (e.g., based on domain of product), and/or to all sources for the offer detail data for the one or more products. For instance, the browser or extension (or the server 115) may transmit an API call for the offer detail data for the one or more products if a corresponding e-commerce webserver of a source supports such API calls. Additionally or alternatively, the browser or extension (or the server 115) may generate and transmit particular request message(s) to cause the e-commerce webservers of sources to transmit response(s) including the offer detail data for the one or more products; and process the responses to obtain the offer detail data for the one or more products from the response(s). Additionally or alternatively, the browser or extension may generate and transmit a request to a product matching application with the product information; the product matching application may receive the product information and respond with matching products for sale at different vendors.

After obtaining the offer detail data for the one or more products from the source(s), the browser or extension (or the server 115) may determine whether any of the sources have at least one particular product available of the one or more products. If at least one source has at least one particular product available, the browser or extension may set one of the available sources as a second source for the second source information. The browser or extension may select sources from the first set of websites over sources from the second set of websites, or select a lowest total cost source (after taking rewards and/or redemption information into account). Additionally or alternatively, the browser or extension may display several sources in the first user interface. In some embodiments, the browser or extension may apply a ranking or weighting criteria to the sources, whereby weights or ranking criteria may be based on various factors such as whether each source is in the first or second set of websites, a total cost for each source, an amount of rewards available (as discussed below) or to be used for each source, etc. Any suitable weighting or ranking schema may be used.

According to an implementation, a volatile or non-volatile memory array may be updated to store a source (e.g., a second source), based on, for example, the source having a particular product available. The volatile or non-volatile memory may be updated via a write operation triggered by a controller providing a command to write the source into memory. The stored source in memory may be called to generate a GUI (e.g., on the first interface) such that the source can be provide via the GUI in a manner faster than if the source was not extracted from the memory.

Generally, as used herein "product available" may mean in stock and for sale, or for sale but not in stock to be shipped currently (e.g., expected to be back in stock soon). The browser or extension and the server 115 may work together (e.g., working in parallel for different sets of the one or more products) or the browser or extension may use the server 115 alone to determine the offer detail data for the one or more products from the sources. In the case that the server 115 determines the offer detail data from the sources, the server 115 may transmit a data message with the results (e.g., as results are determined or when the offer detail data collection is finished).

To obtain the rewards available data, the browser or extension may determine whether purchase of this product would be eligible for rewards associated with the shopping assistant (e.g., at a particular website domain, etc.); and, if so, calculate the rewards using defined rewards functions (e.g., based on cost and rules). To obtain the redemption information (e.g., if the currently viewed webpage is from the first set of websites), the browser or extension may transmit a request message to the server 115. The request message may determine whether the particular product is eligible, determine whether the user account is eligible, and, if so, any redemption information. To determine whether the particular product is eligible, the browser or extension may determine whether one or more of (or be informed by the server 115 based on one of following): (1) cost or total cost is greater than a minimum threshold and/or less than a maximum threshold; (2) product is from website domain whitelist, or not on a website domain blacklist, for specific products; and/or (3) product is on a specific product whitelist, or not a specific product blacklist. To determine whether the user account is eligible, the browser or extension may determine one or more of (or be informed by the server 115 based on one of following): (1) status of the user account indicates eligible for rewards redemption (e.g., eligible, account age greater than age threshold, etc.); (2) fraud detection processes indicates no flag for fraud (e.g., no suspicious history on account or no prior rewards redemptions in a threshold period of time), and/or the rewards amount for the user account is greater than a rewards threshold. The redemption information may include a rewards amount and/or a rewards redemption amount. The rewards redemption amount may be a default value (e.g., pre-defined, $10, or some other dollar value), a minimum amount, a maximum amount, and/or any increments between the minimum and maximum amount for user adjustment.

Returning to the first user interface, the redirect link for current or alternative sources for the particular product may be selectable a user selection. The user selection may be made using a user input which may be provided via a tangible device. For example, the user input may be received by a key press, a click, a press on hardware, a sensor (e.g., gesture sensor), a haptic sensor, or the like. Techniques disclosed herein may be used to present a particular source or comparison results via an interface such that a single user input (e.g., a key press) may be used to select a best option between, for example, a current website and an alternate source. Such single user input may be beneficial over multiple inputs (e.g., to perform multiple targeted searches, selections, and/or comparisons). Such single user input may reduce resource use in comparison to multiple inputs by requiring less signals to be generated and/or transmitted by a tangible device. Additionally, such single input may increase the lifespan of a given tangible device by reducing its use to identify alternate sources and/or targeted searches and comparisons.

Responsive to the user selection to open the new webpage for the particular product, the browser or extension may cause the browser to open the new webpage (e.g., a popup). As mentioned above, the new webpage may be a comparison webpage of the shopping assistant for the particular product, or a product webpage on a particular source for the particular product. Generally, the comparison webpage may be generated (e.g., by the server 115, browser, and/or the browser or extension) responsive to the user selection and based on the offer detail data for the one or more products from the sources. According to an implementation, the comparison webpage may be retrieved from a cache or non-volatile memory, as discussed herein. A read process may be triggered by a controller and the comparison webpage or its location may be retrieved from a memory array. Such a retrieval may be faster than retrieving the comparison webpage from a network resource that may require accessing the network resource via a network connection. The server 115 may receive the offer detail data for the one or more products from the sources from the browser or extension if the browser or extension obtained the offer detail data, or the server 115 may store the offer detail data (e.g., permanently or temporarily, in associated with the user account, or generally for all user accounts) after having obtained the offer detail data for the browser or extension. The comparison webpage may include a recommendation (e.g., lowest overall cost source, lowest overall cost source of a source from the first set of websites) of a source ("recommended source") and/or a table of sources. The recommendation of the recommended source may display offer detail data corresponding to the recommended source and have a recommended source redirect link to a product webpage on a recommended source website for the particular product. The recommended source redirect link may be selectable by a user selection to open a product webpage on the recommended source website in the browser. The table of sources may include all of the offer detail data, or only offer detail data from sources from the first set of websites (if any). The table of sources may have redirect links to each of the sources. The redirect links may be selectable by a user selection to open respective product webpages on the source websites in the browser.

Returning to the second user interface, the second user interface may include the redemption information for a current website domain being viewed, along with additional instructions on how to make use of the rewards redemption amount. The browser or extension may generate and display the second user interface in response to the browser currently viewing an item webpage on a website from among the first set of websites. The browser or extension may obtain the redemption information as discussed above.

The third user interface may include the redemption information and a confirmation element for a current website domain being viewed. The browser or extension may generate and display the third user interface in response to the browser currently viewing a checkout webpage on a website from among the first set of websites. The browser or extension may obtain the redemption information as discussed above. The confirmation element may be selectable by a user selection.

As the browser or extension is continuing to monitor the browser session, the browser or extension may, responsive to opening the new webpage, cause the browser to display the second user interface. For instance, the browser or extension may determine that the new webpage is a website of the first set of websites. This may help guide a user to make sure they are aware of the continued redemption opportunity and reduce confusion on an item/product webpage.

Moreover, as the browser or extension is continuing to monitor the browser session, the browser or extension may determine whether a second trigger condition is satisfied. For instance, the second trigger condition may be a user selection to add the particular product to a shopping cart on a website of the first set of websites and/or the browser navigating to a checkout page on one of the first set of websites. To determine whether a user selection adds the particular product to a shopping cart on a website of the first set of websites, the browser or extension may monitor/parse information from a website domain (as discussed the URLs above) for a domain matching a first set of websites and monitor user selections on item webpages and/or a shopping cart of the domain. To determine whether the browser navigates to the checkout page on source of the first set of websites, the browser or extension may determine whether URL or other features (e.g., parsing syntax/markers from the website domain) indicates a checkout page on a website of the first set of websites (as discussed above). Responsive to the user selection adding the particular product to the shopping cart on the source of the first set of websites and/or navigating to the checkout page on source of the first set of websites, the browser or extension may automatically obtain and apply gift card information to the shopping cart. Alternatively or in addition, the second trigger condition may be satisfied based on a user input. The user input may be provided by a tangible device. For example, the user input may be received by a movement, key press, a click, a press on hardware, a sensor (e.g., gesture sensor), a haptic sensor, or the like. The browser or extension may be configured to detect such input from a tangible device to generate the second trigger.

For instance, responsive to the user selection adding the particular product to the shopping cart on the source of the first set of websites and/or navigating to the checkout page on source of the first set of websites, the browser or extension may cause the browser to display the third user interface. The browser or extension may monitor the product being added to the shopping cart so that the browser or extension knows the product and/or redemption information is still eligible. If the product is not added to the shopping cart, the browser or extension may re-transmit an inquiry to the server 115 to confirm a new product is eligible, etc.

As discussed above, the third user interface includes the redemption information and the confirmation element. As discussed above, the confirmation element may be selectable by a user selection, in order to automatically obtain and apply gift card information to the shopping cart. For instance, responsive to a user selection on the confirmation element, the browser or extension may transmit an instruction to the shopping assistant to obtain the gift card information; receive a response message from the shopping assistant, the response message including particular gift card information associated with a user account of the user; and automatically apply the particular gift card information to the shopping cart. Generally, the instruction message to the shopping assistant may be an instruction message to the server 115 to obtain a gift card to be automatically applied by the browser or extension to the shopping cart. The server 115 may obtain one (or more) gift cards from the ledger information; assign the one (or more) gift cards to the user account; update the ledger information accordingly; reduce a rewards amount of the user account in the account information; and transmit the response message with the particular gift card information. Generally, unassigned gift cards may act as a bank of gift cards to be used. For instance, the bank of gift cards may allow the server 115 to provide and assign gift cards without having to obtain gift cards from sources/third parties in real-time. In this case, the confirmation before assigning may reduce a risk of gift cards in the bank being assigned with a user but not used. Alternatively or (additionally if the bank of gift cards is or may soon be exhausted), the server 115 may obtain gift cards from the sources/third parties in real-time, in response to a user selection of the confirmation element. To obtain gift card information from the sources/third parties in real-time, the browser or extension and/or the server 115 may automatically generate gift card information based on responses from a particular source. For instance, the browser or extension and/or the server 115 (on behalf of the browser or extension, in response to user selection of the confirmation element) may automatically generate an inquiry message (e.g., using a script) to query the particular source with a gift card redemption request; and receive, from the particular source, the gift card information, to be auto populated in the checkout page. The particular source may communicate with the server 115 to determine a status of a user account and/or rewards balance to determine whether to provide the gift card information; and generate and transmit the gift card information to the browser or extension.

To apply the gift card, the browser or extension may transmit a request to an e-commerce associated with the website to apply the gift card information to the shopping cart. Additionally or alternatively, the browser or extension may edit the checkout page to add the gift card information to gift card input fields on the checkout page on behalf of the user. For instance, the browser or extension may automatically populate gift card input fields on the checkout page with particular text corresponding to the gift card information to apply the gift card. The application of the gift card may be automatic such that additional resources in accessing an additional website, additional gift card servicer, or the like, are not expended. Additionally, a user interface or GUI may continue to provide content (e.g., an original check out page) instead of calling, receiving, and displaying additional content (e.g., related to the additional website, additional gift card servicer, or the like). By continuing to provide content instead of calling, receiving, and displaying additional content, less resources may be expended and, thereby the lifespan of the resources may be extended.

The browser or extension may continue monitoring the browser session to confirm that the checkout was completed with the gift card information. For instance, the browser or extension may analyze webpages to determine whether a confirmation page of purchase is currently being viewed, and, if so, confirm that corresponding gift card data appears on the confirmation page. The browser or extension may transmit an update message to the shopping assistant (e.g., the server 115). The server 115 may then update the ledger information to reflect that the one or more gift cards were used. The server 115 may also transmit an alert to a user account or device associated with the user account (e.g., email or text message) with the particular gift card information.

Additionally or alternatively, the first trigger condition may trigger on a currently viewed webpage of a website of the first set of websites when no other source (e.g., to be the second source) has a lower cost (or other benefit) (e.g., after considering redemption information) than the currently viewed webpage. In this manner, the user may be informed of relative savings without being redirected away from the current webpage. In this case, a first user interface may be displayed that indicates no other source has a lower cost (or other benefit). Subsequently, the browser or extension may proceed to determine whether a second trigger condition is satisfied, and the process may be substantively similar to as discussed above.

Figure 2A:
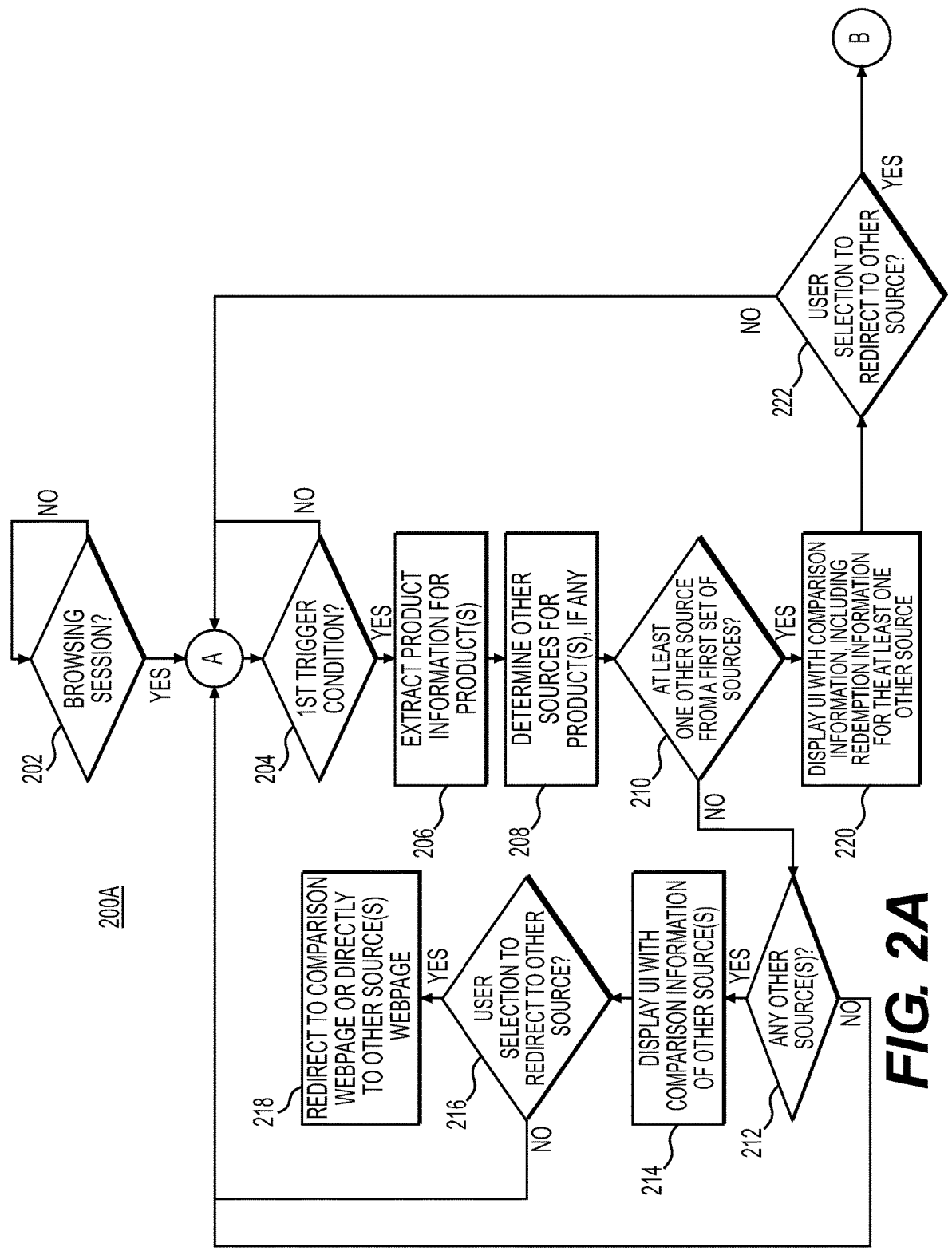
FIGS. 2A and 2B depict flowcharts for automatic product comparison using price comparison with reward redemption options indicating relative price reduction, according to one or more embodiments.
Figure 2B:
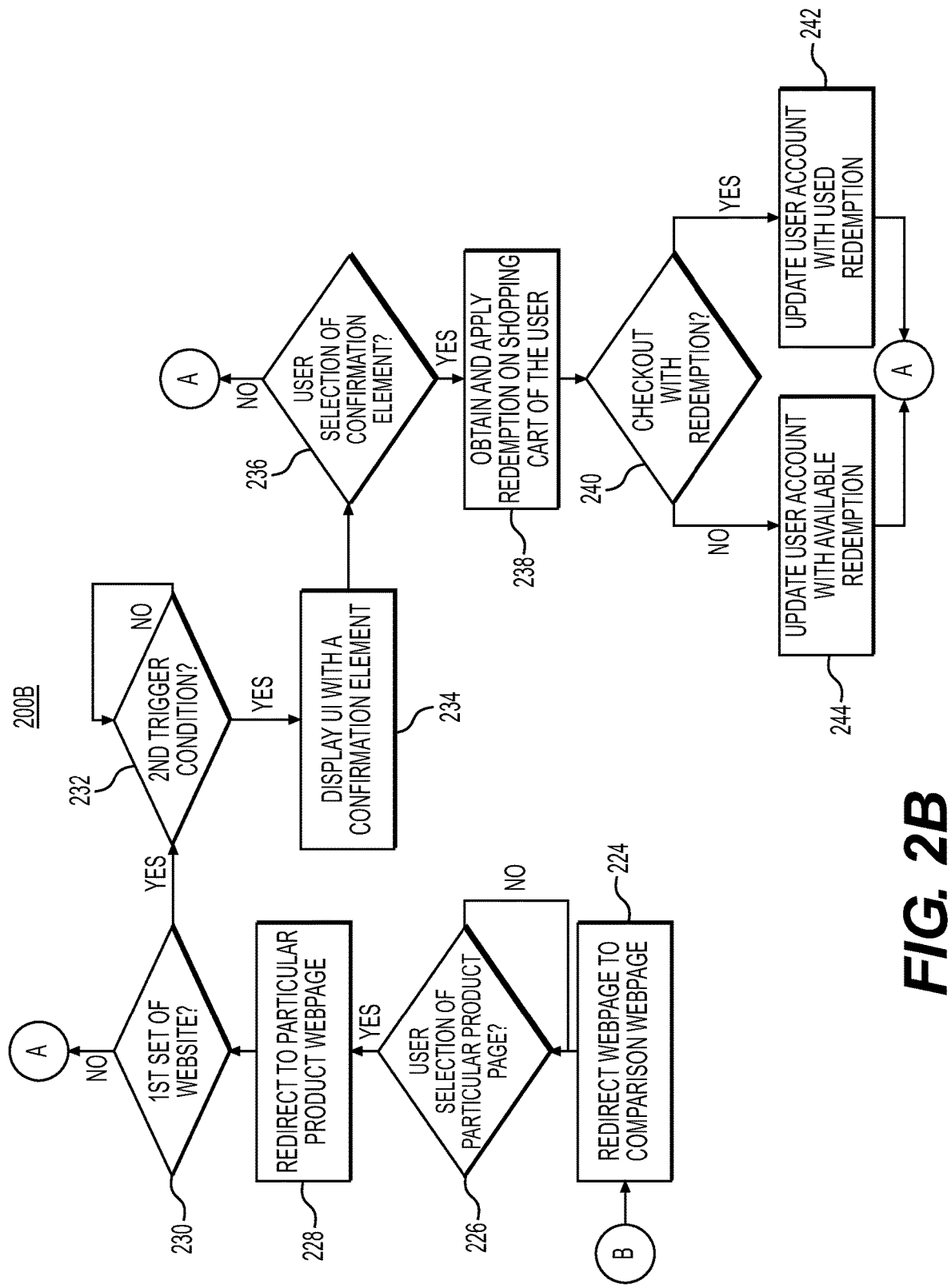
Figure 3A:
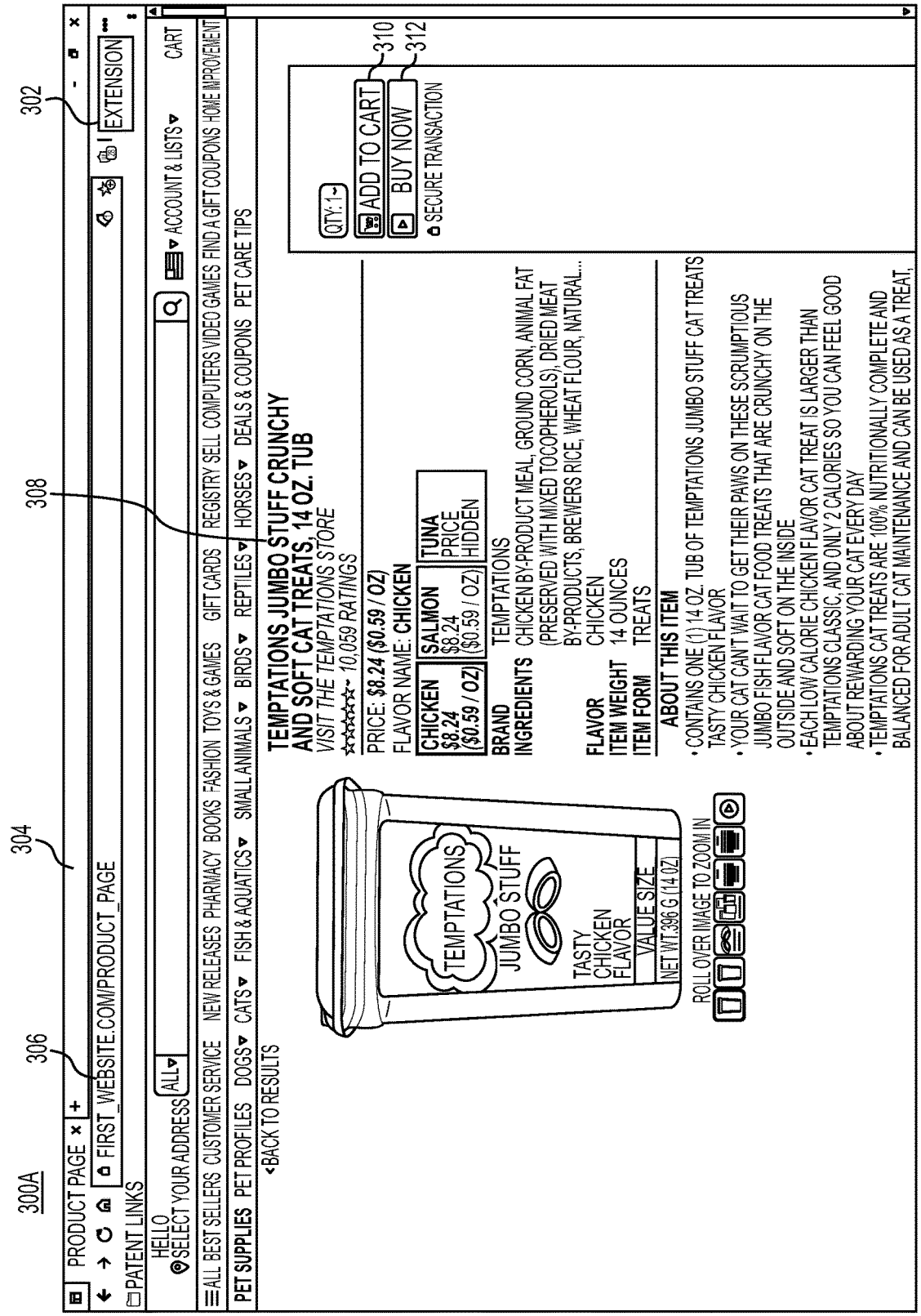
Figure 3B:
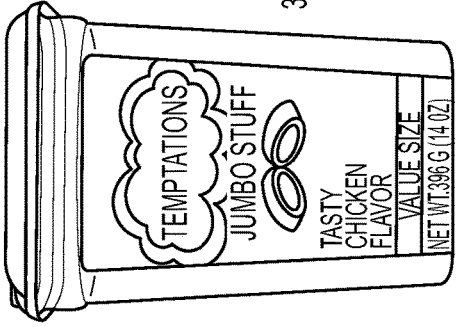
Figure 3C:
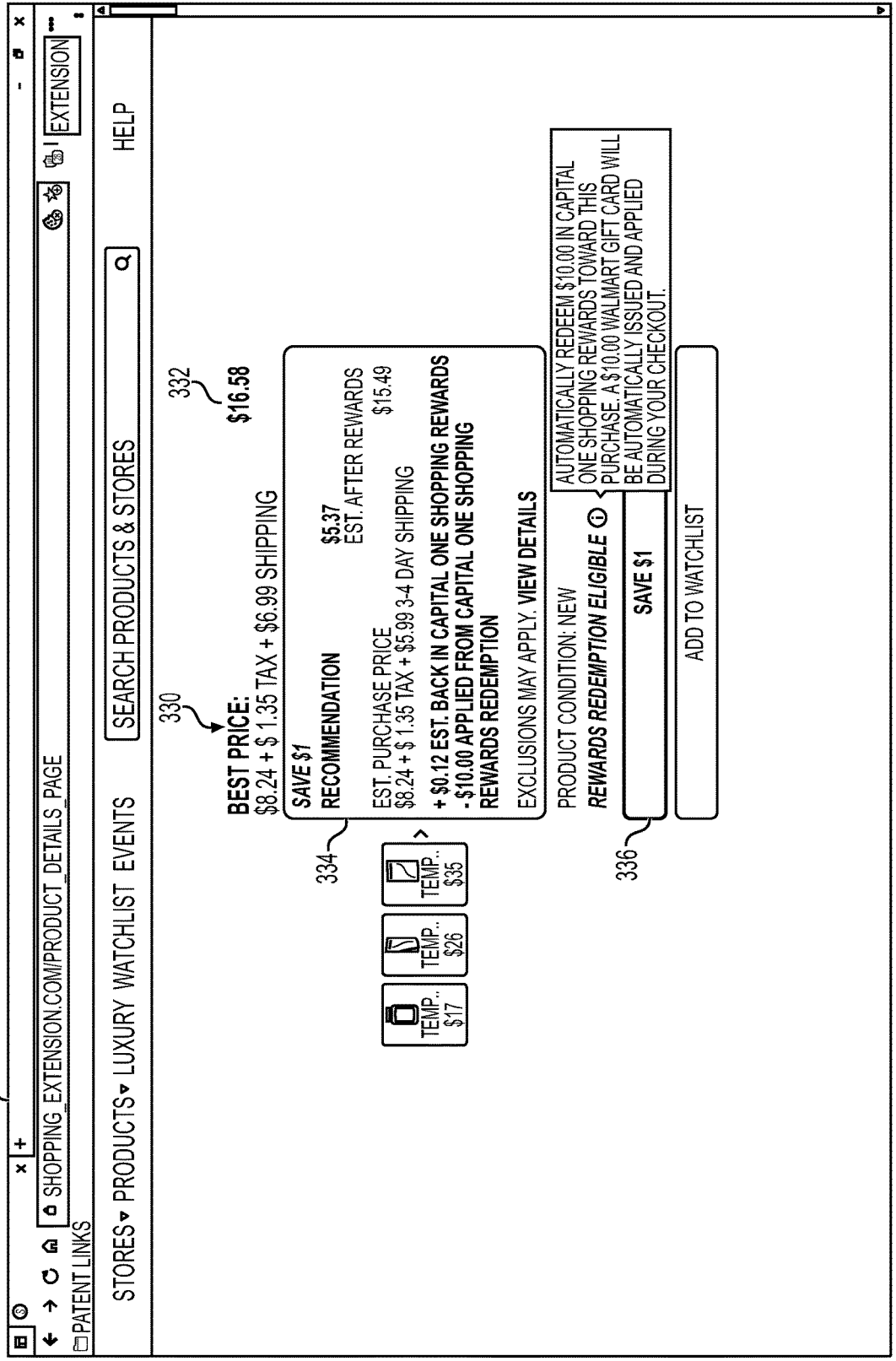
Figure 3D:
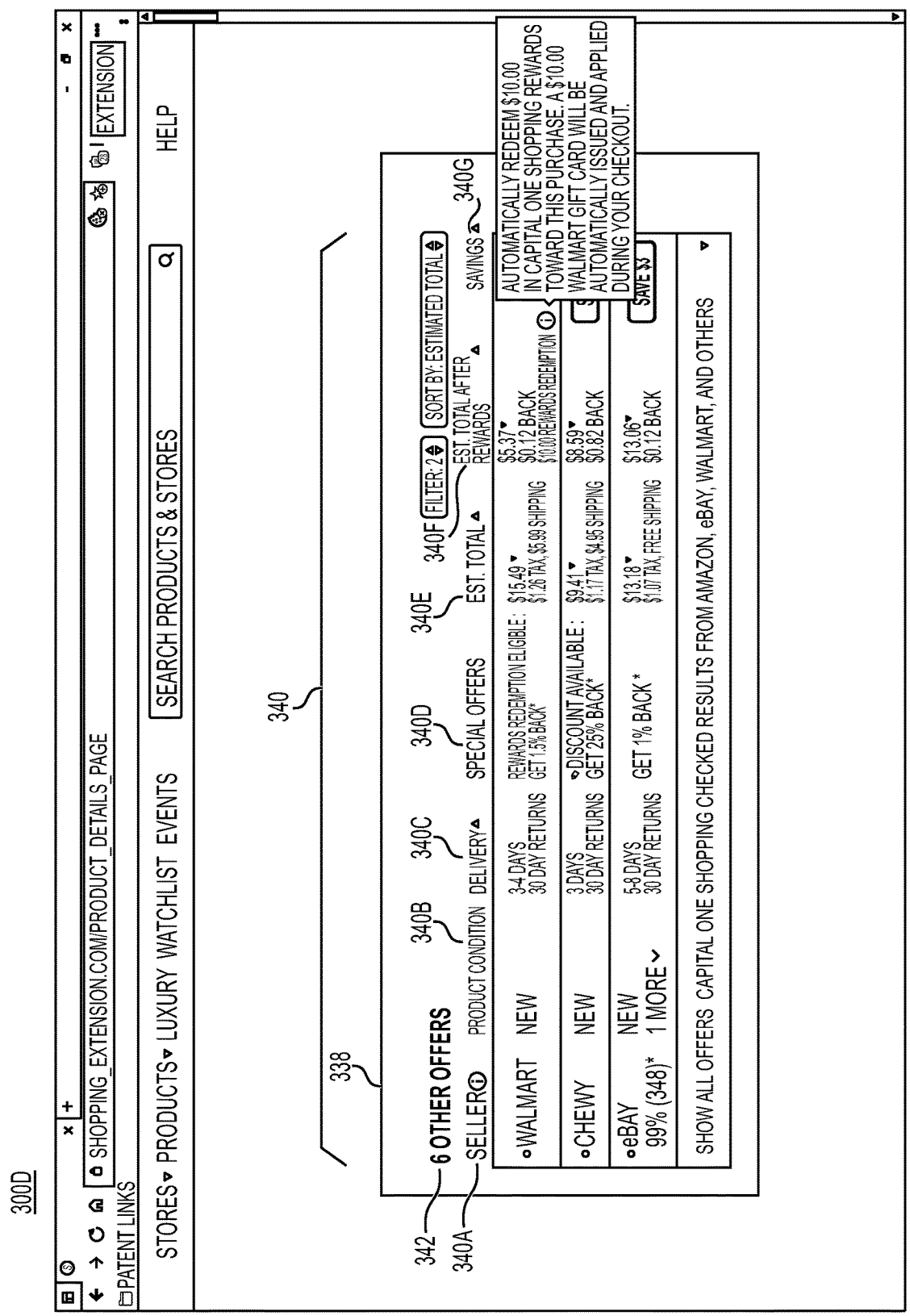
Figure 3E:
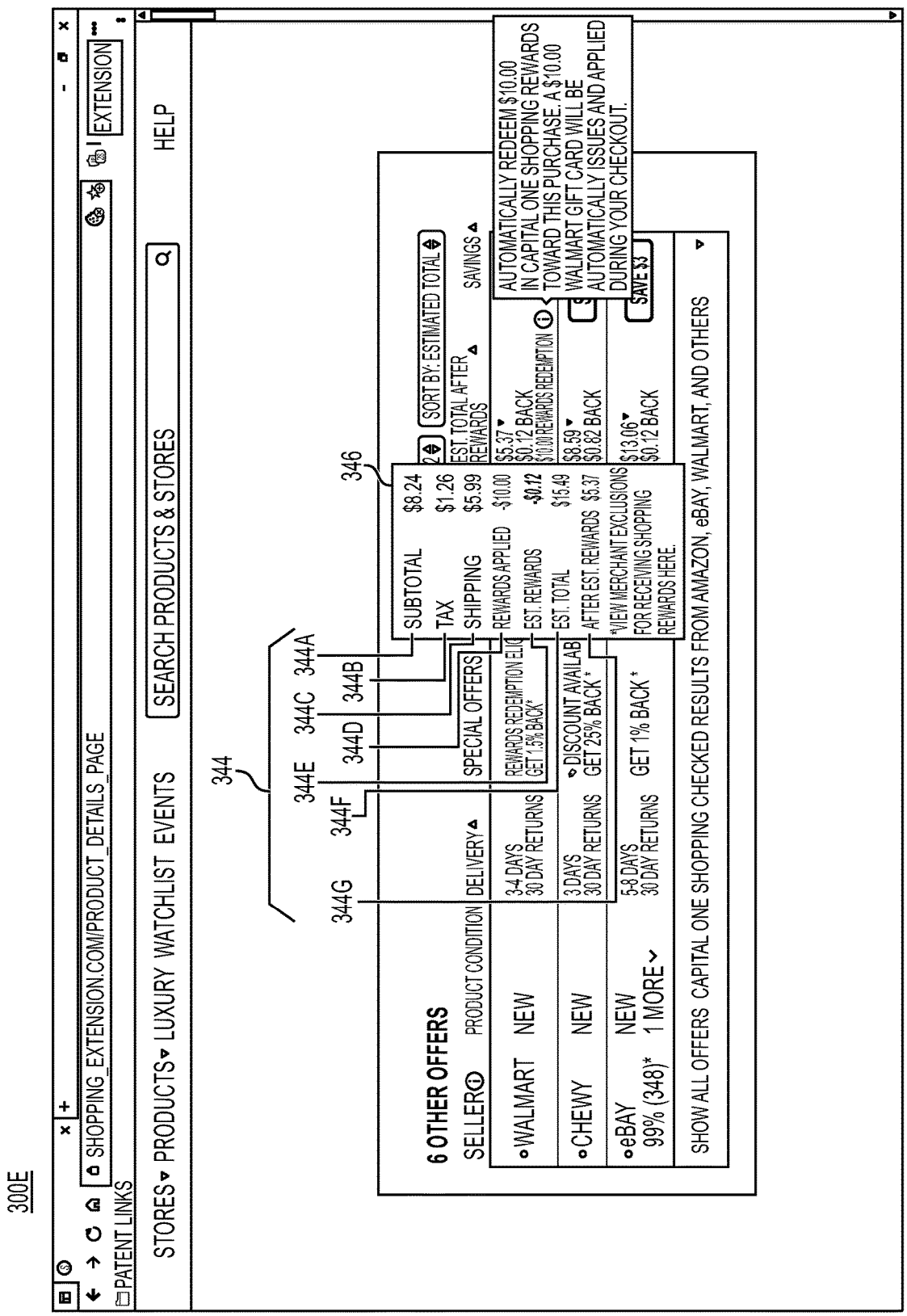
Figure 3F:
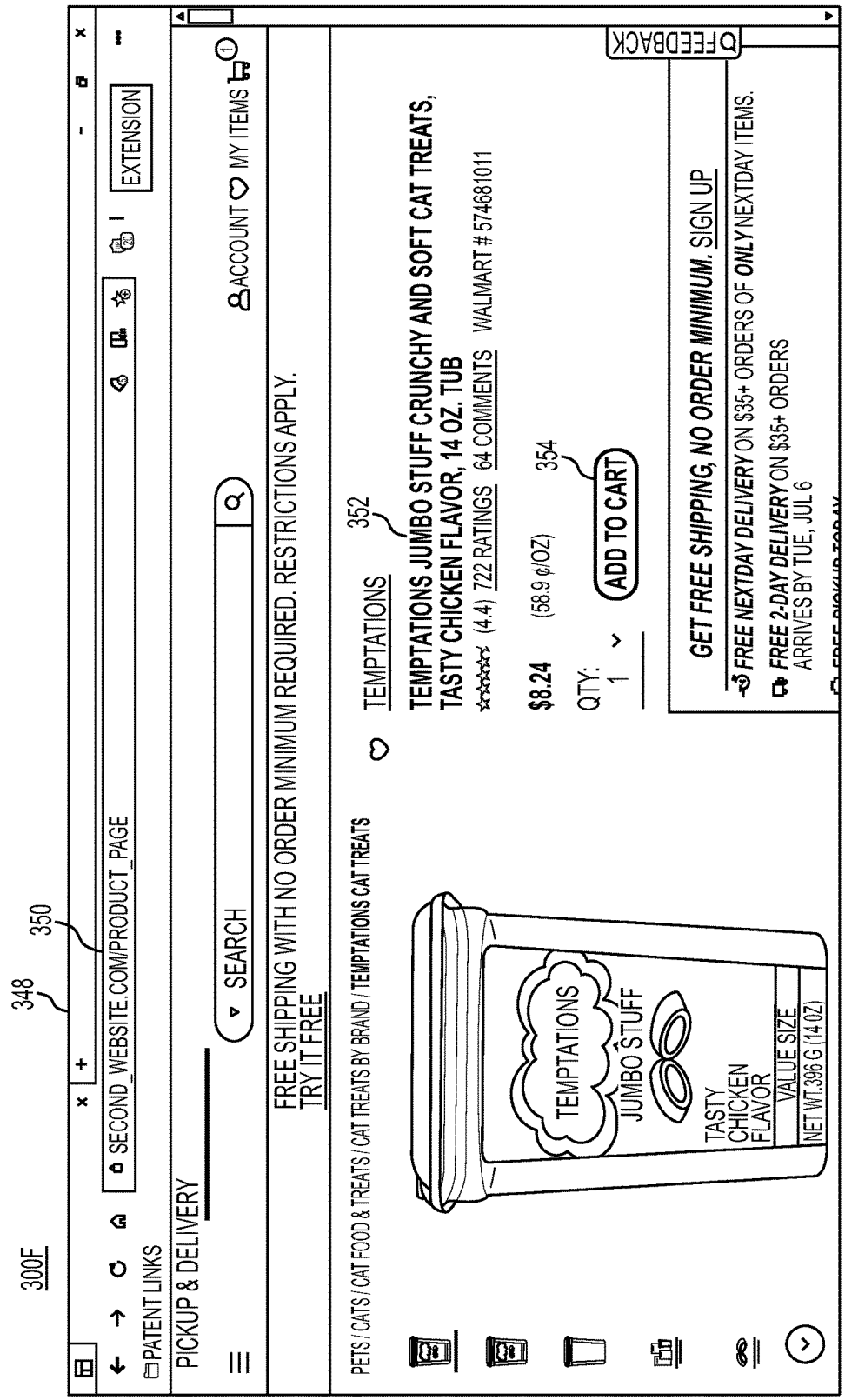
Figure 3G:
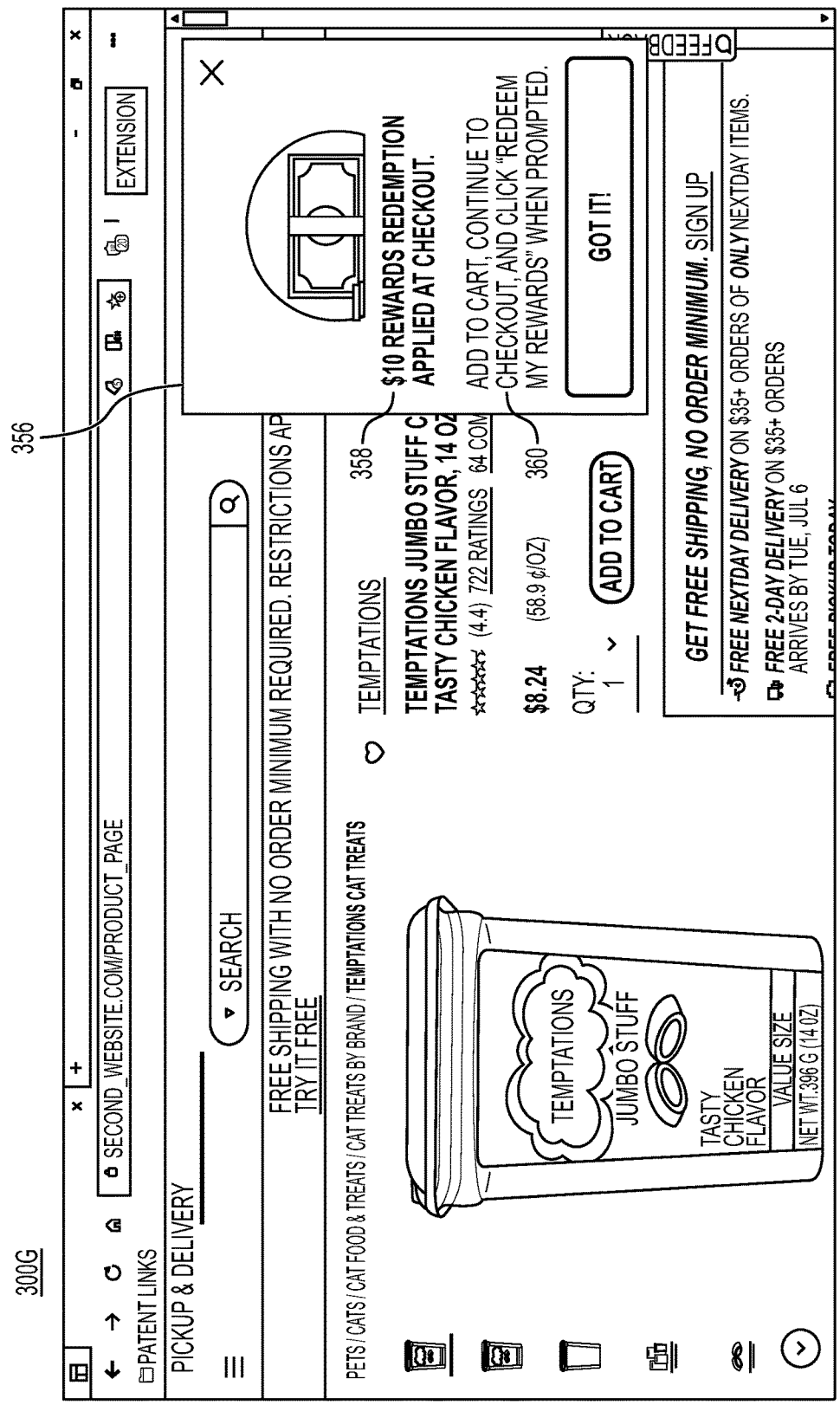
Figure 3H:
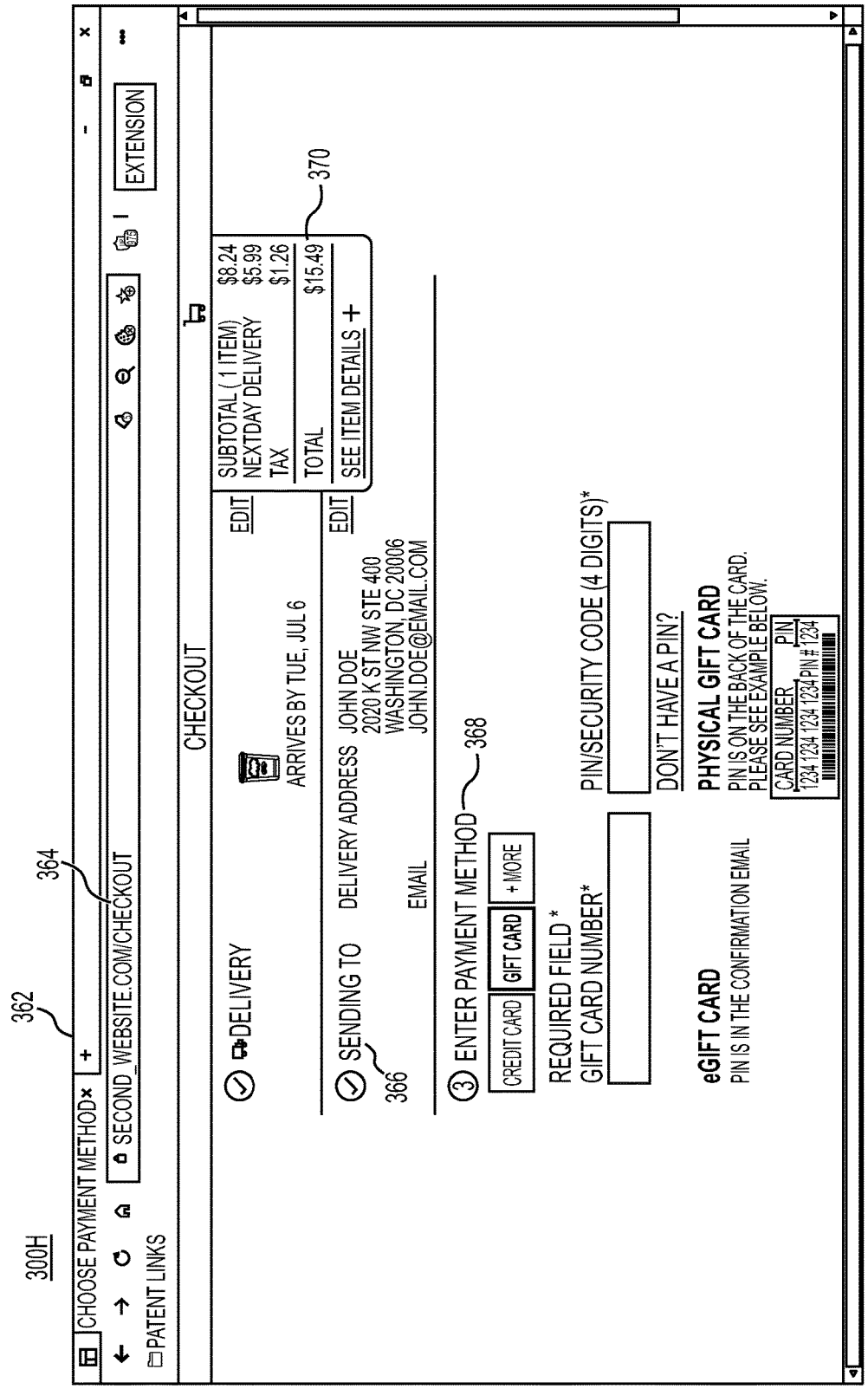
Figure 3J:

Turning to FIGS. 2A and 2B, FIGS. 2A and 2B depict flowcharts 200A and 200B for automatic product comparison using price comparison with reward redemption options indicating relative price reduction, according to one or more embodiments. The flowchart 200A and flowchart 200B may be implemented by the browser or extension, in cooperation with the server 115 and/or an e-commerce server 120A or 120B. The flowcharts 200A and 200B may start by the browser or extension determining whether a browser session has started (Block 202). For instance, the browser or extension may monitor websites visited by the browser and determine whether any websites are among the first or second set of websites.

In response to determining the browser session has not started (Block 202: No), the browser or extension may proceed to determine whether a browser session has started (Block 202). In response to determining the browser session has started (Block 202: Yes), the browser or extension may proceed to determine whether a first trigger condition is satisfied (Block 204). For instance, the browser or extension may determine whether an item webpage or checkout page of a website of the second set of websites is currently being viewed, as discussed above.

In response to determining the first trigger condition is not satisfied (Block 204: No), the browser or extension may proceed to return to determine whether the first trigger condition is satisfied (Block 204). In response to determining the first trigger condition is satisfied (Block 204: Yes), the browser or extension may proceed to extract product information for product(s) (Block 206). For instance, the browser or extension may analyze webpage documents, as discussed above.

The browser or extension may then determine other source(s) for the product(s), if any (Block 208). For instance, the browser or extension may obtain the offer detail data, as discussed above.

The browser or extension may then determine whether at least one other source is from a first set of sources (Block 210). For instance, the browser or extension may determine whether there is a source that has at least one product available, and the source is from a website of the first set of websites, as discussed above.

In response to determining there is not at least one other source from a first set of sources (Block 210: No), the browser or extension may proceed to determine whether there are any other source(s) (Block 212). For instance, the browser or extension may determine there are no other source(s), or that all other sources are not from a first set of websites. In response to determining there are no other sources (Block 212: No), the browser or extension may proceed to determine whether the first trigger condition is satisfied (Block 204). In response to determining there are other sources (Block 112: Yes), the browser or extension may proceed to display a first user interface with comparison information (Block 214). For instance, the browser or extension may display the first user interface without the redemption information while still displaying product comparison information with a redirect link to the user. The browser or extension may then proceed to determine whether a user selection selects the redirect link (Block 216). In response to determining no user selection selects the redirect link (Block 216: No), the browser or extension may proceed to return to determine whether the first trigger condition is satisfied (Block 204). In response to determining a user selection selects the redirect link (Block 216: Yes), the browser or extension may proceed to redirect the browser to a comparison webpage or directly to other source(s) webpage (Block 218). The browser or extension may proceed to return to determine whether the first trigger condition is satisfied (Block 204). In this manner, the browser or extension may continue to monitor the browser session, in case the user switches to a different item webpage or checkout page and different products are being viewed on the current webpages.

In response to determining there is at least one other source from a first set of sources (Block 210: Yes), the browser or extension may proceed to cause the browser to display the first user interface with comparison information, including redemption information for the at least one other source (Block 220). For instance, the browser or extension may display the first user interface with the first source information, the second source information (including the redemption information) and a redirect link, as discussed above.

The browser or extension may then proceed to determine whether a user selection selects to redirect to other source (Block 222). For instance, the browser or extension may determine whether a user selection selects the redirect link, as discussed above. In response to determining no user selection to redirect to other source (Block 222: No), the browser or extension may proceed to return to determine whether the first trigger condition is satisfied (Block 204). In this manner, the browser or extension may continue to monitor the browser session, in case the user switches to a different item webpage or checkout page and different products are being viewed on the current webpages.

In response to determining a user selection selects to redirect to other source (Block 222: Yes), the browser or extension may proceed to redirect the browser to a comparison webpage (Block 224). For instance, the browser may transmit a request for a comparison webpage for the particular product, and the server 115 may generate and transmit the comparison webpage to the browser, as discussed above.

The browser or extension may then proceed to determine whether a user selection selects a particular product page (Block 226). For instance, the browser or extension may monitor whether a user selects to continue product/price comparison, or to continue with a redemption opportunity. In response to determining no user selection to a particular product page (Block 226: No), the browser or extension may proceed to return to determine whether a user selection selects a particular product page (Block 226). For instance, the browser or extension may continue to monitor whether a user selects to continue product/price comparison, or to continue with a redemption opportunity.

In response to determining a user selection selects a particular product page (Block 2226: Yes), the browser or extension may proceed to cause the browser to redirect to a particular product webpage corresponding to the user selection. (Block 228). The browser or extension may then proceed determine whether the user selection selected a website of the first set of websites (Block 230). For instance, the browser or extension may extract a domain of the particular product webpage and compare the domain to the first set of websites to determine whether any match. In response to determining the user selection did not select a website of the first set of websites (Block 202: No), the browser or extension may proceed to return to determine whether the first trigger condition is satisfied (Block 204). In response to determining the user selection did select a website of the first set of websites (Block 230: Yes), the browser or extension may proceed to determine whether a second trigger condition is satisfied (Block 232). For instance, the browser or extension may determine whether a user selection adds the particular product to a shopping cart and/or the browser navigates to a checkout page on a website of the first set of websites, as discussed above.

In response to determining the second trigger condition is not satisfied (Block 232: No), the browser or extension may proceed to return to determine whether second trigger condition is satisfied (Block 232). For instance, the browser or extension may continue to monitor the browser session and display first user interfaces on item webpages for different products on the website of the first set of websites, or determine whether a user leaves the website, in either case the browser or extension would return to determine whether the first trigger condition is satisfied (Block 204).

In response to determining the second trigger condition is satisfied (Block 232: Yes), the browser or extension may proceed to display the third user interface with a confirmation element (Block 234). For instance, the browser or extension may wait for a user selection of the confirmation element, to avoid assigning gift cards before a user has committed to the redemption process.

The browser or extension may then proceed determine whether a user selection selects the confirmation element (Block 236). For instance, the browser or extension may monitor whether a user confirms to apply a gift card, or declines the automatic application of a gift card based on rewards of the shopping assistant, as discussed above. In response to determining no user selection of the confirmation element (Block 236: No), the browser or extension may proceed to return to determine whether the first trigger condition is satisfied (Block 204). In this manner, the browser or extension may continue to monitor the browser session, in case the browser views other item webpages or checkout pages with different products.

In response to determining a user selection of the confirmation element (Block 236: Yes), the browser or extension may proceed to obtain and apply a redemption on the shopping cart of the user (Block 238). For instance, the browser or extension may request gift card information from the server 115 and apply the gift card information for the gift card(s), as discussed above.

The browser or extension may then proceed determine whether the checkout with the redemption is completed (Block 240). For instance, the browser or extension may monitor the browser session to confirm that the gift card(s) were used in a checkout process, as discussed above. For instance, the user may change their mind after selecting the confirmation element and not checkout, but a gift card has already been assigned to the user.

In response to determining the checkout with the redemption is not completed (Block 240: No), the browser or extension may proceed to update the user account with an available redemption (Block 244). In response to determining the checkout with the redemption is completed (Block 240: Yes), the browser or extension may proceed to update a user account with a used redemption (Block 242). For instance, the browser or extension may transmit, to the server 115, a completion message indicating the gift card has been used, or a fault message indicating the gift card(s) were not used in a completed checkout transaction, and the server 115 may update account information and ledger information appropriately, as discussed above. In either case, the browser or extension may then proceed to return to determine whether the first trigger condition is satisfied (Block 204). Generally, in the case the gift card is not used with a checkout, the gift card may remain assigned to the user account. The server 115 may ensure the user has access to the gift card information (e.g., by sending a message to a user contact, such as an email or text message), so the user may still use the gift card information. The server 115/shopping assistant may generate a reminder and/or notification to inform the user to use the gift card, e.g., by visiting a website of the first set of websites. Additionally or alternatively, the shopping assistant may allow a claw back of a gift card to be un-assigned to the user, so that the user may use the rewards redemption for a different product/transaction.

FIGS. 3A-3J depict GUIs 300A-300J for automatic product comparison using price comparison with reward redemption options indicating relative price reduction, according to one or more embodiments. In GUI 300A, a browser may display an item webpage 304 in the browser, with a browser or extension 302 of the present disclosure installed. The item webpage 304 may have several elements, including a first URL 306, product description 308, add-to-cart button 310, and/or instant-buy button 312. The browser or extension may have already determined a browser session has started, or may do so now, and determine whether the first trigger condition is satisfied.

In GUI 300B, the browser or extension has determined the first trigger condition has been satisfied, has extracted production information from the item webpage, and obtained the offer detail data for other sources. In this case, the browser or extension generates and causes the browser to display a first user interface 314 with comparison information, including redemption information. The first user interface 314 includes first source information 316, with a total cost 318, and a second user information 320, with redemption information 322 and a total cost 324 from an alternative source. The first user interface also includes a redirect link 326 selectable by a user selection.

In GUI 300C, the browser or extension determines a user selection selects the redirect link 326, and causes the browser to redirect to a comparison page 328. In this case, the comparison page 328 incudes a recommendation 330. The recommendation 330 includes offer detail data for a source, including a base price 332 and an explanation 334. The explanation 334 may include all or some of offer detail data for the source. In this case, the explanation 334 indicates cost, tax, shipping rate and duration, rewards, and redemption information. The comparison page 328 may also include a redirect link 336. The redirect link 336 may be user selectable by a user selection to redirect the browser to a particular product webpage of the recommended source.

In GUI 300D, the browser or extension may instead (or responsive to a user selection of a component of the recommendation) display a table of sources 338 in the comparison page 328. The table of sources 338 may be based on the full set of offer detail data, discussed above, or be limited to websites of the first set of websites. The table of sources 338 may indicate a number of sources 342 and data 340 for each source. The data 340 may include a source label 340A, a condition label 340B, delivery-time frame 340C, any special offers 340D, an estimate of total 340E, estimate of total after redemption 340F, and/or a savings indication 340G. Any of the elements associated with a particular source may be redirect link to that particular source, or only a region associated with savings indication 340G.

In GUI 300E, the browser or extension may display an accounting popup 346 over comparison page 328 for a particular source, e.g., in response to a user selection of an element. The accounting popup 346 may explain product details 344, including subtotal 344A, tax 344B, shipping costs 344C, redemption information 344D (if applicable), estimated rewards 344E, an estimated total 344F, and/or an estimate total after rewards 344G.

In GUI 300F, the browser or extension may determine a user selection selected the redirect link 336 or a particular source of the table of sources 338, and, in response, the browser was redirected to a particular product webpage 348 for the particular product of one of the sources. In this case, the particular product webpage 348 is on a website of the first set of websites. The particular product webpage 348 may have several elements, including a second URL 350, product description 352, and/or an add-to-cart button 354. The browser or extension may determine whether the second trigger condition is satisfied, and determine whether a second user interface 356 is to be displayed.

In GUI 300G, the browser or extension may determine to display the second user interface 356. The second user interface 356 may indicate the redemption information 358 and user instructions to use the redemption information 360.

In GUI 300H, the browser may navigate to a checkout page 362. The checkout page 362 may have several elements, including a third URL 364, checkout fields 366, payment fields 368, and/or total cost content 370. The browser or extension may determine that the checkout page 362 is on a website of the first set of websites and that the checkout page 362 is a checkout page based on the elements of the checkout page 362, so the second trigger condition is satisfied.

In GUI 300I, the browser or extension may display the third user interface 372 on the checkout page 362. The third user interface 372 may include informational text indicating redemption information 374, and/or a confirmation element 376. As discussed above, the confirmation element 376 may be user selectable to automatically obtain and apply gift card information to the shopping for the user. Notably, a user may adjust the redemption information to a different redemption amount (within the minimum and maximum amounts and according to increments, if any).

In GUI 300J, the browser or extension may have automatically obtained a gift card and applied the gift card to the shopping cart, in response a user selection of the confirmation element 376. For instance, the browser or extension may enter text corresponding to the gift card in corresponding fields 378 and 380.

Therefore, systems and methods of the present disclosure may automatically determine different sources for online items and accurately present differences in cost after taking into consideration of redemption of rewards associated with a user's account. Moreover, the systems of the present disclosure may automatically obtain and apply reward redemption gift cards on behalf of a user to a user's shopping cart, thereby reducing transcription errors and saving user's time and effort.

FIG. 4 depicts an example system that may execute techniques presented herein. FIG. 4 is a simplified functional block diagram of a computer that may be configured to execute techniques described herein, according to exemplary embodiments of the present disclosure. Specifically, the computer (or "platform" as it may not be a single physical computer infrastructure) may include a data communication interface 460 for packet data communication. The platform may also include a central processing unit ("CPU") 420, in the form of one or more processors, for executing program instructions. The platform may include an internal communication bus 410, and the platform may also include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, the computer-implemented method comprising:

monitoring a browser session of a browser operating on a user device associated with a user;

determining, using a processor, whether a first trigger condition is satisfied based on monitoring the browser session, the first trigger condition indicating whether a currently viewed webpage having a first domain is an item webpage or a checkout webpage of a website of a second set of websites different from a first set of websites;

responsive to the first trigger condition being satisfied, extracting product information from the currently viewed webpage having the first domain;

determining other sources corresponding to the product information, each of the other sources having a unique domain, each unique domain different than the first domain and different than each other unique domain;

responsive to determining the other sources, determining redemption information for a particular source of the sources, the particular source having a second domain different than the first domain, in response to the particular source being one of the first set of websites and the particular source having at least one product available that corresponds to the product information extracted from the currently viewed webpage;

receiving an available gift card amount associated with the particular source and the second domain, the available gift card amount being available to the user;

modifying the redemption information by applying the available gift card amount to generate a modified redemption information;

generating a first user interface with comparison information including the modified redemption information and a redirect link being selectable by a user selection to open a new webpage for the particular source, the new webpage having the second domain;

causing the browser to display the first user interface with the comparison information and the redirect link;

monitoring the browser session to determine whether the user adds the product to a shopping cart on the particular source and/or navigates to a checkout page on the particular source;

responsive to a user navigating to a checkout page on the particular source, automatically obtaining and applying gift card information to the shopping cart, wherein automatically obtaining and applying the gift card information to the shopping cart includes:

displaying a second user interface, the second user interface including at least the redemption information and a confirmation element, the confirmation element being selectable by a user selection;

responsive to a user selection on the confirmation element, transmitting an instruction to a shopping assistant to obtain the gift card information;

receiving a response message from the shopping assistant, the response message including particular gift card information associated with a user account of the user; and automatically applying the particular gift card information to the shopping cart.

2. The computer-implemented method of claim 1, wherein the first set of websites include websites of e-commerce websites that are associated with a shopping assistant, and monitoring the browser session is performed by an instance of the shopping assistant on the browser of the user device.

3. The computer-implemented method of claim 1, wherein the available gift card amount corresponds to an amount of rewards associated with a user account of a shopping assistant, the user account associated with the user.

4. The computer-implemented method of claim 1, wherein the available gift card amount is set to a default value or is user adjustable.

5. The computer-implemented method of claim 1, wherein determining the other sources corresponding to the product information includes:
- obtaining inventory information for a plurality of sources;
- determining whether any of the plurality of sources has available the at least one product available that corresponds to the product information extracted from the currently viewed webpage based on the inventory information and the product information; and
- responsive to determining at least one other source of the plurality of sources has available the at least one product, determining whether the at least one other source is from the first set of websites.

6. The computer-implemented method of claim 1, wherein automatically obtaining the gift card information further includes:
- automatically generating an inquiry message using a script to query the particular source with a gift card redemption request, the gift card redemption request indicating a requested redemption amount and user account; and
- receiving, from the particular source, the gift card information, the particular source communicating with a server of a shopping assistant to determine a status of a user account and/or rewards balance to determine whether to provide the gift card information, wherein automatically applying the gift card information to the shopping cart includes:
- automatically populating gift card inputs fields on the checkout page with particular text corresponding to the gift card information.

7. A system, the system comprising:
at least one memory storing instructions; and
at least one processor executing the instructions to perform operations, the operations including:
- monitoring a browser session of a browser operating on a user device associated with a user;
- determining, using the at least one processor, whether a first trigger condition is satisfied based on monitoring the browser session, the first trigger condition indicating whether a currently viewed webpage having a first domain is an item webpage or a checkout webpage of a website of a second set of websites different from a first set of websites;
- responsive to the first trigger condition being satisfied, extracting product information from the currently viewed webpage having the first domain;
- determining other sources corresponding to the product information, each of the other sources having a unique domain, each unique domain different than the first domain and different than each other unique domain;
- responsive to determining the other sources determining redemption information for a particular source of the other sources, the particular source having a second domain different than the first domain, in response to the particular source being one of the first set of websites and the particular source having at least one product available that corresponds to the product information extracted from the currently viewed webpage;
- receiving an available gift card amount associated with the particular source and the second domain, the available gift card amount being available to the user;
- modifying the redemption information by applying the available gift card amount to generate a modified redemption information;
- generating a first user interface with comparison information including the modified redemption information and a redirect link being selectable by a user selection to open a new webpage for the particular source, the new webpage having the second domain;
- causing the browser to display the first user interface with the comparison information and the redirect link;
- determining whether the user adds the particular product to a shopping cart on the particular source and/or navigates to a checkout page on the particular source; and
- responsive to a user navigating to a checkout page on the particular source, automatically obtaining and applying gift card information to the shopping cart;
- automatically generating an inquiry message using a script to query the particular source with a gift card redemption request, the gift card redemption request indicating a requested redemption amount and user account; and
- receiving, from the particular source, the gift card information, the particular source communicating with a server of a shopping assistant to determine a status of a user account and/or rewards balance to determine whether to provide the gift card information, wherein automatically applying the gift card information to the shopping cart includes:
- automatically populating gift card inputs fields on the checkout page with particular text corresponding to the gift card information.

8. The system of claim 7, wherein the first set of websites include websites of e-commerce websites that are associated with a shopping assistant,
- monitoring the browser session is performed by an instance of the shopping assistant on the browser of the user device, and
- the modified redemption information indicates an available gift card amount to be applied at checkout on the particular source.

9. The system of claim 8, wherein the available gift card amount corresponds to an amount of rewards associated with a user account of the shopping assistant, the user account associated with the user.

10. The system of claim 9, wherein the available gift card amount is set to a default value or is user adjustable.

11. The system of claim 7, wherein determining the other sources corresponding to the product information includes:
- obtaining inventory information for a plurality of sources;
- determining whether any of the plurality of sources has available the at least one product available that corresponds to the product information extracted from the currently viewed webpage based on the inventory information and the product information; and
- responsive to determining at least one other source of the plurality of sources has available the at least one product, determining whether the at least one other source is from the first set of websites.

12. The system of claim 7, wherein the operations further include:
responsive to the user selection to open the new webpage for the particular source, opening the new webpage, the new webpage having a third domain and being a comparison webpage of a shopping assistant for a particular product or a product webpage on the particular source for the particular product, the comparison webpage being generated responsive to the user selection; and
responsive to opening the new webpage having the third domain, causing the browser to display a second user interface, the second user interface including at least the modified redemption information.

13. A non-transitory computer-readable medium may store instructions that, when executed by a processor, cause the processor to perform a method, the method comprising:
monitoring a browser session of a browser operating on a user device associated with a user;
determining whether a trigger condition is satisfied based on monitoring the browser session, the trigger condition indicating whether a currently viewed webpage, having a first domain, is a checkout webpage of a website of a first set of websites different from a second set of websites;
responsive to the trigger condition being satisfied,
extracting product information from the currently viewed webpage having the first domain;
determining other sources corresponding to the product information, each of the other sources having a unique domain, each unique domain different than the first domain and different than each other unique domain;
responsive to determining the other sources determining redemption information for a particular source of the other sources, the particular source having a second domain different than the first domain, in response to the particular source being one of the first set of websites and the particular source having at least one product available that corresponds to the product information extracted from the currently viewed webpage;
receiving an available gift card amount associated with the particular source and the second domain, the available gift card amount being available to the user;
modifying the redemption information by applying the available gift card amount to generate a modified redemption information;
generating a first user interface with comparison information including the modified redemption information and a redirect link being selectable by a user selection to open a new webpage for the particular source, the new webpage having the second domain;
causing the browser to display the first user interface with the comparison information and the redirect link;
determining whether the user adds a particular product to a shopping cart on the particular source and/or navigates to a checkout page on the particular source;
responsive to a user navigating to a checkout page on the particular source, automatically obtaining and applying gift card information to the shopping cart, wherein automatically obtaining and applying the gift card information to the shopping cart includes:
displaying a second user interface, the second user interface including at least the redemption information and a confirmation element, the confirmation element being selectable by a user selection;
responsive to a user selection on the confirmation element, transmitting an instruction to a shopping assistant to obtain the gift card information;
receiving a response message from the shopping assistant, the response message including particular gift card information associated with a user account of the user; and
automatically applying the particular gift card information to the shopping cart.

* * * * *